(12) United States Patent
Simske et al.

(10) Patent No.: US 8,601,276 B2
(45) Date of Patent: *Dec. 3, 2013

(54) MANAGING ACCESS TO A SECURE CONTENT-PART OF A PPCD FOLLOWING INTRODUCTION OF THE PPCD INTO A WORKFLOW

(75) Inventors: Steven J. Simske, Fort Collins, CO (US); Helen Balinsky, Cardiff Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 216 days.

This patent is subject to a terminal disclaimer.

(21) Appl. No.: 13/192,189

(22) Filed: Jul. 27, 2011

(65) Prior Publication Data

US 2013/0031366 A1    Jan. 31, 2013

(51) Int. Cl.
*H04L 9/32* (2006.01)
*G06F 11/30* (2006.01)
*G06F 17/30* (2006.01)
*G06F 15/16* (2006.01)

(52) U.S. Cl.
USPC ........... 713/180; 713/189; 707/758; 707/783; 709/201; 709/238

(58) Field of Classification Search
USPC .......... 713/168–174, 182–186, 202; 709/225, 709/229; 726/2–6
See application file for complete search history.

(56) References Cited

U.S. PATENT DOCUMENTS

| | | | |
|---|---|---|---|
| 6,978,017 B2 | 12/2005 | Wiener et al. | |
| 7,587,368 B2 | 9/2009 | Felsher | |
| 7,831,827 B2 | 11/2010 | Walmsley | |
| 7,831,829 B2 | 11/2010 | Appenzeller et al. | |
| 2005/0021836 A1* | 1/2005 | Reed et al. | 709/238 |
| 2008/0282318 A1 | 11/2008 | Rits | |
| 2009/0077376 A1 | 3/2009 | Montagut et al. | |
| 2009/0198548 A1 | 8/2009 | Kohler et al. | |
| 2010/0114780 A1 | 5/2010 | Tribe et al. | |
| 2010/0174731 A1* | 7/2010 | Vermeulen et al. | 707/758 |
| 2012/0303968 A1* | 11/2012 | Balinsky et al. | 713/189 |
| 2013/0031369 A1* | 1/2013 | Balinsky et al. | 713/176 |

OTHER PUBLICATIONS

Premature silent workflow termination in publicly posted composite documents; Systems, Man, and Cybernetics (SMC), 2011 IEEE International Conference on; Date of Conference: Oct. 9-12, 2011; Author(s): Balinsky, H. Liqun Chen; Simske, S. pp. 1292-1297; year 2011.*

(Continued)

*Primary Examiner* — Evans Desrosiers (57) ABSTRACT

In a method for managing access to a secure content-part of a PPCD following introduction of the PPCD into a workflow among a plurality of workflow participants, in a secure content manager, from a workflow participant of the plurality of workflow participants, a key-map file for a subsequent workflow participant that is to receive the key-map file is received, wherein the key-map file comprises a set of keys to enable the subsequent workflow participant to access the content-part in the PPCD. In addition, authenticity of the received key-map file is verified, the subsequent workflow participant to receive the PPCD is identified and authenticated, a public key of the subsequent workflow participant is accessed, the key map file or a symmetric key used to encrypt the key-map file prior to receipt of the key-map file by the secure content manager is encrypted using the public key of the subsequent workflow participant, and the encrypted key-map file is sent to the subsequent workflow participant.

15 Claims, 5 Drawing Sheets

(56) References Cited

OTHER PUBLICATIONS

Differential access for publicly-posted composite documents with multiple workflow participants; Authors: Helen Y. Balinsky Hewlett-Packard, Bristol, United Kingdom, Steven J. Simske Hewlett-Packard, Fort Collins, CO, USA; Published in: Proceedings of the 10th ACM symposium on Document engineering pp. 115-124; year 2010.*

* cited by examiner

MANAGING ACCESS TO A SECURE CONTENT-PART OF A PPCD FOLLOWING INTRODUCTION OF THE PPCD INTO A WORKFLOW

CROSS REFERENCE TO RELATED APPLICATIONS

The present application contains common subject matter with copending and commonly assigned PCT Application Serial No.: PCT/US10/49638, titled "Providing Differential Access to a Digital Document", filed on Sep. 21, 2010, U.S. patent application Ser. No. 12/949,510, titled "Managing Access to a Secure Digital Document", filed on Nov. 18, 2010, U.S. patent application Ser. No. 13/014,062, titled "Managing Information in a Document Serialization", filed on Jan. 26, 2011, U.S. patent application Ser. No. 13/050,888, titled "Document Management System and Method", filed on Mar. 17, 2011, U.S. patent application Ser. No. 13/106,354, titled "Managing Sequential Access to Secure Content Using an Encrypted Wrap", filed on May 12, 2011, and U.S. patent application Ser. No. 13/192,205, titled "Managing Access Right Changes to Secure Content", filed on Jul. 27, 2011, the disclosures of which are hereby incorporated by reference in their entireties.

BACKGROUND

In recent years, there has been a growing trend to move away from printing information on paper and instead, to the use of digital documents, which contain digital content. Examples of digital documents include, for instance, portable document format (pdf) documents, electronic spreadsheets, electronic drawings, documents generated through use of a word processing application, and html pages. The digital documents may also include composite documents that include a mixture of different types of formats.

With paper documents, an individual's signature or other handwritten marks are used to determine whether various changes or additions to the documents were made by an authorized individual. However, such modifications are not possible or are inconvenient with digital documents because these types of modifications will require the individual to print the digital document, sign or otherwise mark the document, and scan the marked document to prove that the modifications were made by the individual. This manner of controlling access to the documents, both paper and electronic, is easily attacked and may easily be counterfeited.

Various techniques have been proposed to prevent or reduce attacks and counterfeiting of digital documents. These techniques typically employ a database, such as, but not limited to filesystem, MICROSOFT SHAREPOINT, etc., upon which the digital documents are stored so that access to the database, or a network to which the database is connected, is controlled by preventing access to the database or network to a user unless that user possesses some secret information, such as, a user identification and password. As such, in order for these security techniques to enforce access control on the digital documents, users are required to be granted access to the database or network.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "n", "m", and "x" following a reference numeral is intended to denote an integer value that is greater than 1. In addition, ellipses (" . . . ") in the figures are intended to denote that additional elements may be included between the elements surrounding the ellipses. Moreover, the terms "a" and "an" are intended to denote at least one of a particular element. As used herein, the term "includes" means includes but not limited to, the term "including" means including but not limited to. The term "based on" means based at least in part on.

Disclosed herein are a secure content manager and a method for managing access to a secure content-part of a publicly posted composite document (hereinafter referred to as a "PPCD") following introduction of the PPCD into a workflow among a plurality of workflow participants (herein after referred to as "participants"). More particularly, for instance, the method and apparatus disclosed herein generally enable the PPCD to be managed while the PPCD is within the workflow. In addition, the PPCD may be managed without requiring that a document master/author/creator be involved with the management of the PPCD once the PPCD has been introduced into the workflow. In other words, the secure content manager and method discussed herein enable autonomous management of the PPCD following its introduction into the workflow.

Through implementation of the secure content manager and method discussed herein, the PPCD may be managed to control the flow of the PPCD among the various participants. For instance, the secure content manager may enable a participant whose credentials were unknown at the time the PPCD was introduced into the workflow to be added to the workflow. In addition, or alternatively, the secure content manager may hide the identity of a participant located further downstream or upstream along the workflow order from other participants. Moreover, the secure content manager may automatically create a backup of the PPCD, may automatically timestamp the PPCD, may perform a security compliance check on the PPCD, etc., at various points along the workflow.

As used throughout the present disclosure, PPCD comprises a digital document that contains content-parts that have been encrypted and signed to substantially prevent unauthorized access to the content-parts. The content-parts may comprise a variety of individual addressable and accessible parts (units) in the form of separate files or addressable file fragments. For example, the units may include individual files, groups of files, or file fragments, such as, html fragments, xml nodes and elements, presentation slides, word processing text boxes, parts of a spreadsheet document, an electronic object containing drawings, an electronic object having flash video capabilities, etc., and combinations of different types of units. In addition, the content-parts of a particular digital document may comprise the same format or different formats from each other or a single content-part may include fragments and files having different formats from each other as described for instance, in the Ser. No. 13/106,354 application for patent.

As also disclosed herein, access to the PPCD by the participants of the workflow may be controlled through distribution of various sets of keys contained in respective key-map files for the participants. More particularly, a subset of the keys may be contained in key-map files within a PPCD, with at least one key-map file for each participant. Thus, for a relatively large workflow there may be a large number of separate key-map files in a PPCD, which is equal to or larger than the number of participants that are to receive the secure content. As discussed in greater detail herein below, each key-map file is encrypted and is intended to be decrypted only by the intended participant.

In one example, each of the key-map files is encrypted using a respective public key of a participant who is intended to access the keys contained therein. In this example, the secure content manager may receive a PPCD containing a key-map file for a participant, in which the key-map file has been encrypted using a public key of the secure content manager. In addition, the secure content manager may decrypt the encrypted key-map file using the secure content manager's private key and may encrypt the key-map file using a public key of the participant. The secure content manager may also sign the key-map file of the participant using the public signature key of the secure content manager, place the encrypted and signed key-map file back into the PPCD, and release the PPCD to the participant. Prior to these operations, the secure content manager may authenticate the participant, establish a corresponding trusted public key for the participant, etc.

In another example, each of the key-map files is encrypted using a symmetric key generated or derived for the respective participants and the symmetric keys are encrypted using the respective public keys of the participants. In this example, the secure content manager may receive a PPCD containing a key-map file for a participant, in which the key-map file has been encrypted using a symmetric key and in which the symmetric key has been encrypted using a public key of the secure content manager. In addition, the secure content manager may decrypt the encrypted symmetric key using the secure content manager's private key and may encrypt the symmetric key using the public key of the subsequent participant. As such, for instance, the secure content manager need not decrypt the key-map file in this example. According to an example, the symmetric keys may be combined into an entry table that indicates which of the symmetric keys are associated with which of the participants to enable the participants to quickly identify which of the symmetric keys they are able to decrypt using their respective private keys. Examples of the entry table may be found in the Ser. No. 13/014,062 application for patent.

In either of the examples above, the participant that is to receive the PPCD from the secure content manager is unable to access the key-map file for that participant until the secure content manager has decrypted the key-map file using its public key and re-encrypted the decrypted key-map file using the public key of that participant. As such, access to the key-map file, and thus, to the content-parts of the PPCD by the participant subsequent to the secure content manager may be controlled.

Figure 1:
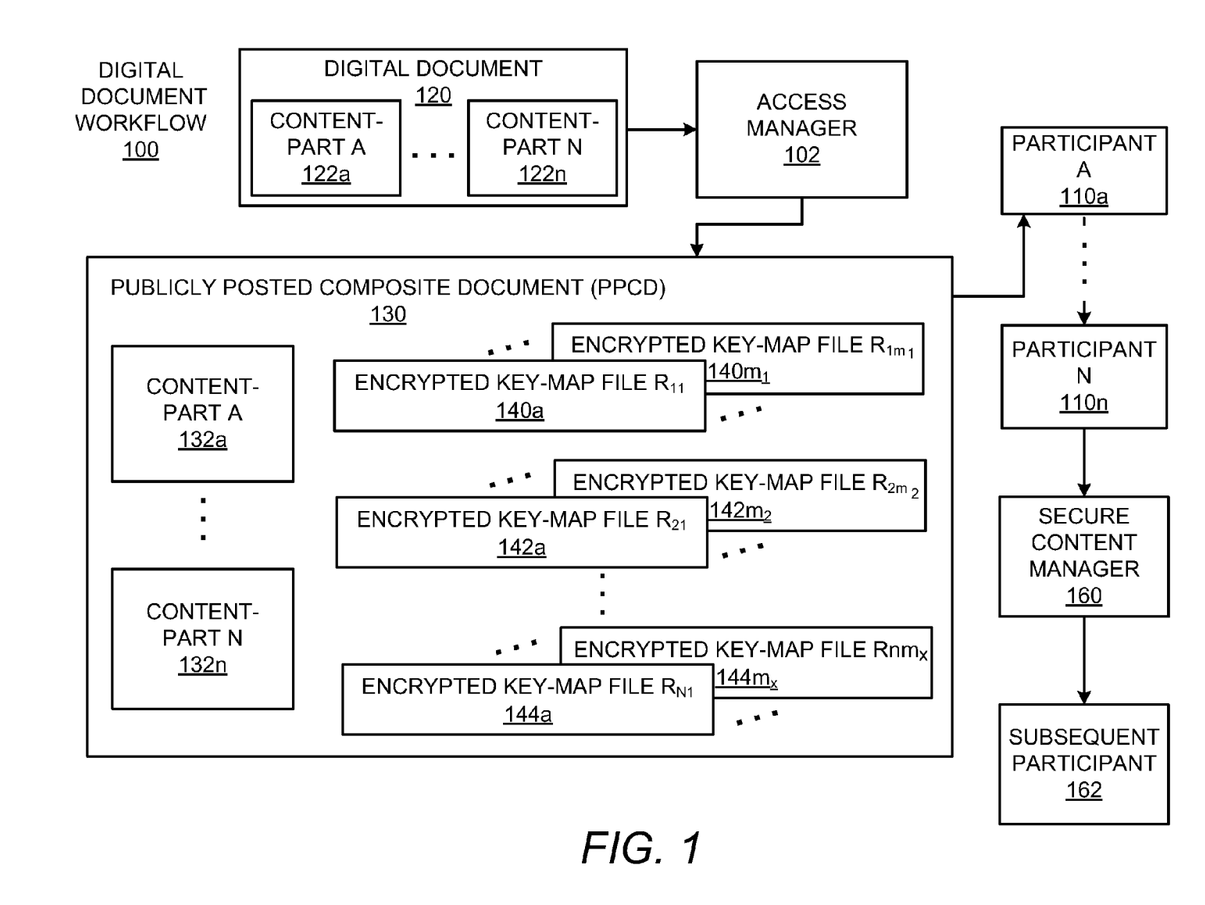
FIG. 1 illustrates a simplified schematic diagram of a digital document workflow, according to an example of the present disclosure.

With reference first to FIG. 1, there is shown a simplified diagram of a digital document workflow 100, according to an example. It should be apparent that the diagram depicted in FIG. 1 represents a generalized illustration and that other components may be added or existing components may be removed, modified or rearranged without departing from a scope of the digital document workflow 100.

The digital document workflow 100 is depicted as including an access manager 102, a plurality participants 110a-110n, a secure content manager 160, a subsequent participant 162, a digital document 120 containing a plurality of content-parts 122a-122n, and a publicly posted composite document (hereinafter "PPCD") 130. The PPCD 130 is also depicted as containing a plurality of secure content-parts 132a-132n and encrypted key-map files 140a-144$m_x$. As used herein, the term "secure" is intended to denote that the content-parts 132a-132n and the key-map files 140a-144$m_x$ are encrypted and signed.

The access manager 102 may comprise a hardware device, such as, a computer, a server, a circuit, etc., to perform various functions in encrypting documents and controlling distribution of keys to each of the participants 110a-110n to access the content-parts. The participants 110a-110n generally represent computing devices through which the participants 110a-110n may receive, and when granted sufficient access, to at least one of view, edit, and acknowledge receipt of the PPCD 130. The computing devices may comprise, for instance, personal computers, laptop computers, tablet computers, personal digital assistants, cellular telephones, etc. Various functions that the access manager 102 and the participants 110a-110n perform are discussed in greater detail herein.

The access manager 102 may be in a secure environment where the digital document owner/creator/master has access to the access manager 102, and at least one of the computing devices of the participants 110a-110n is outside of the secure environment. In other words, some or all of the participants 110a-110n may not access the PPCD 130 from a common database that controls access to the PPCD 130. Instead, the PPCD 130 may be supplied to and among the participants 110a-110n through, for instance, e-mail, a shared server, direct file transfer, removable storage medium, cloud service, etc. In addition, some or all of the participants 110a-110n may not be granted access to the secure environment of the access manager 102 in instances where such access is impractical or prohibited.

The digital document 120 may comprise any reasonably suitable type of document in a digital form and may comprise at least one digital document, which may be in the same or different formats with respect to each other. Examples of suitable document types include, for instance, portable document format, spreadsheet, JPEG or any other image, word processing document, hypertext markup language (html), etc. In addition, the content-parts 122a-122n generally comprise individual addressable elements within the digital document 120, such as, signature lines, cells or columns within a spreadsheet, paragraphs, graphics boxes, etc. The content-parts 122a-122n may also be extended to the byte level, for instance, as different elements of the same spreadsheet. As another example, the content-parts 122a-122n may comprise logical aggregations of parts from multiple digital documents. As a further example, digital documents may be in multiple content-parts 122a-122n.

According to an example, the access manager 102 is to restrict access to the content-parts 132a-132n, such that the participants 110a-110n are unable to access the content-parts 132a-132n unless the participants 110a-110n have the appropriate keys to access the content-parts 132a-132n at the appropriate content access session. In other words, the access manager 102 is to encrypt and sign the content-parts 132a-132n such that the participants 110a-110n are required to use different sets of keys depending upon where the PPCD 130 is in the workflow, as described in greater detail in U.S. patent application Ser. No. 13/192,205. In any regard, the access manager 102 may generate (or derive) needed encryption and signature keys, encrypt and sign the content-parts 122a-122n and may supply the generated PPCD 130 to a first participant 110a in the workflow.

Moreover, access control over the content-parts 132a-132n by the participants 110a-110n may be effected while at least one of the participants 110a is outside of at least one of a common and a uniformly-secure environment as another one of the participants 110b. That is, for instance, at least some of the participants 110a-110n may attempt to access the content-parts 132a-132n in environments with different levels of security with respect to each other.

As also shown in FIG. 1, the PPCD 130 comprises encrypted key-map files $R_{ij}$ 140a-144$m_x$. In the key-map files $R_{ij}$, the subscript "i" denotes the participant and the subscript "j" denotes the content access session or workflow step. In this regard, each of the key-map files 140a-144$m_x$ contains respective sets of keys to be used by the respective participants 110a-110n in decrypting, and verifying the signatures of the content-parts 132a-132n for respective content access sessions (j). More particularly, the key-map files 140a-144$m_x$ contain respective sets of keys that enable the participants 110a-110n to attain various levels of access to the content-parts 132a-132n. According to an example, each set of encrypted key-map files 140a-140$m_1$, 142a-142$m_2$, 144a-144$m_x$ is associated with a particular participant 110a-110n. In this example, for instance, a first set of encrypted key-map files 140a-140$m_1$ is associated with a first participant 110a, a second set of encrypted key-map files 142a-142$m_2$ is associated with a second participant 110b, and so forth. In addition, the encrypted key-map files 140a-144$m_x$ may randomly be ordered with respect to each other to prevent determination of the order of the participants 110a-110n from the listing of the encrypted key-map files 140-144$m_x$. Moreover, each of the encrypted key-map files $R_g$ 140a-140$m_1$ in a particular set contains a set of keys to enable access by the participant 110a (i) to the content-parts 132a-132n during a particular content access session (j). Although each of the sets of encrypted key-map files 140a-140$m_1$, 142a-142$m_2$, 144a-144$m_x$ has been described as being associated with each of the participants 110a-110n, it should be understood that at least one of the participants 110a-110n may be associated with a single encrypted key-map file, for instance, when the participant 110a is to access the secure content once during a workflow.

Various manners in which access to the secure content-parts 132a-132n by the participants 110a-110n during different content access sessions are described in U.S. patent application Ser. Nos. 13/106,354 and 13/050,888. As discussed in those applications for patent, the participants 110a-110n may not be able to access the secure content-parts 132a-132n until other participants 110a-110n have viewed/modified the content-parts 132a-132n, According to an example in which the participants 110a-110n are to access the PPCD 130 once, the encryption keys associated with the participants 110a-110n may comprise the respective public keys of the participants 110a-110n. In this example, the decryption keys for decrypting the respective encrypted key-map files 140a-144$m_x$ by the participants 110a-110n may not need to be distributed to the participants 110a-110n since the participants 110a-110n may use their private keys to decrypt the respective encrypted key-map files 140a-144$m_x$.

In addition, or alternatively, the key-map files 140a-144m may be encrypted through use of respective symmetric keys generated and/or derived for each of the key-map files 140a-144m. In this example, the respective symmetric keys may be encrypted through use of the public keys of the participants 110a-110n. As discussed above, the symmetric keys may be combined into an entry table to enable the participants to quickly identify which of the key-map files contains their respective sets of keys.

The access manager 102 may incorporate the encrypted key-map files 140a-144$m_x$ into the PPCD 130, such that, the encrypted key-map files 140a-144$m_x$ may simultaneously be provided to the participants 110a-110n with the PPCD 130. Alternatively, however, the encrypted key-map files 140a-144$m_x$ may be stored on a separate medium and distributed to the participants 110a-110n. In addition, although not shown, each of the encrypted key-map files 140a-144$m_x$ may include document level information, which comprises readily-verifiable document level information that links the PPCD 130 and the workflow. The document level information may contain various information including, for instance, a unique document identifier, a timestamp, the deadline of submission to the next participant 110b-110n in the workflow, etc. The document level information may also contain information pertaining to the next participant 110b-110n in the workflow to which a current participant 110a is to supply the PPCD 130. This information may include, for instance, an email address, a postal address, a web address, etc., of the next participant 110b-110n or in certain instances, the secure content manager 160.

According to an example, each of the encrypted key-map files 140a-144$m_x$ is signed by the document master signature key, with each participant 110a-110n having received or being able to receive the corresponding document master's signature verification key. The authenticity of the encrypted key-map files 140a-144$m_x$ within the received PPCD 130 may therefore be automatically verified upon receiving the PPCD 130 through use of the document master's signature verification key to authenticate the signature of the encrypted key-map files 140a-140$m_x$.

As shown in FIG. 1, the secure content manager 160 is positioned to receive the PPCD 130 along the workflow of the participants 110a-110n. In this regard, similarly to the participants 110a-110n, the secure content manager 160 is to receive the PPCD 130 as part of the workflow and may receive the PPCD 130 more than once during a workflow. In addition, a number of key-map files corresponding to the number of times the secure content manager 160 is to receive the PPCD 130 may be provided for the secure content manager 160. The secure content manager 160 is also to verify the authenticity of the PPCD 130, perform one or more tasks associated with the PPCD 130, and to ship the PPCD 130 to the next participant 162 as predefined in the workflow. However, unlike the other participants 110a-110n, the secure content manager 160 need not read or edit the content-parts 132a-132n of the PPCD 130. Instead, the secure content manager 160 is to perform other tasks as discussed in greater detail herein.

Thus, one of the participants 110n may be instructed, for instance, based upon information contained in the key-map file for that participant 110n, to forward the PPCD 130 to the secure content manager 160 as part of the predetermined workflow order. According to an example, a plurality of the participants 110a-110n may be instructed, for instance, based upon information contained in the key-map file for those participants 110a-110n, to forward the PPCD 130 to the secure content manager 160 at various times during a workflow. As such, for instance, the participants 110a-110n may forward the PPCD 130 to the secure content manager 160 when the secure content manager 160 is named as the next participant in their corresponding key-map file. In this regard, although the secure content manager 160 and the subsequent participant 162 have been depicted in FIG. 1 as following the last participant 110n, the secure content manager 160 and/or the subsequent participant 162 may be positioned between any of the participants 110a-110n in the workflow as well as between multiple ones of the participants 110a-110n. According to an example, the secure content manager 160 comprises an on-line service that requires a previous workflow participant 110a-110n to upload the PPCD 130 to the on-line service. In this example, the subsequent participant 162 may download the PPCD 130 from the on-line service. In another example, the secure content manager 160 comprises an off-line service, for instance, that accepts the PPCD 130 from a previous workflow participant 110a-110n as an email attachment. In this example, the secure content manager 160 may email the PPCD 130 as an email attachment to the subsequent participant 162.

According to an example, the access manager 102 generates a key-map file 144a for the subsequent participant 162 and incorporates the key-map file 144a into the PPCD 130, for instance, in the same manner as the encrypted and signed key-map files for the other participants 110a-110n are incorporated into the PPCD 130. However, in contrast with the other participants 110a-110n, the access manager 102 may encrypt the key-map file 144a or a symmetric key used to encrypt the key-map file 144a with the public key of the secure content manager 160 instead of the public key of the subsequent participant 162. As such, the subsequent participant 162 is unable to access the key-map file 144a until the key-map file 144a has been decrypted by the secure content manager 160 through use of the secure content manager's private key.

The key-map file 144a for the subsequent participant 162 may require decryption (and encryption) by the secure content manager 160 in instances where, for example, the access manager 102 was not provided with the identity or the public key of the subsequent participant 162 when the access manager 102 generated the PPCD 130. Thus, for instance, although the access manager 102 may have been aware of the subsequent participant 162 when the PPCD 130 was created, the access manager 102 may not have been provided with the public key of the subsequent participant 162 during that time. In this example, the secure content manager 160 may receive a complete PPCD 130 that includes the key-map file 144a for the subsequent participant 162. In another example, the secure content manager 160 may receive just the key-map file 144a for the subsequent participant 162 and the PPCD 130, without the key-map file 144a, may be sent directly to the subsequent participant 162. In this example, the secure content manager 160 may decrypt the key-map file 144a using its private key and may re-encrypt and send the key-map file 144a to the subsequent participant 162. The secure content manager 160 may also authenticate the subsequent participant 162 to establish a valid and trusted public key for the subsequent participant 162.

The secure content manager 160 may serve to conceal the identity of the subsequent participant 162 from the previous participant(s) 110a-110n and may also conceal the identity of a previous participant from a subsequent participant in the workflow. Thus, for instance, by causing a participant 110n to send the PPCD 130 to the secure content manager 160 instead of to the subsequent participant 162, the identity of the subsequent participant 162 may be concealed from the participant 110n. In addition, the identity of the previous participant 110n may be concealed from the subsequent participant 162 since the subsequent participant 162 receives the PPCD 130 from the secure content manager 160.

In other examples, the secure content manager 160 may receive the PPCD 130 during the workflow among the participants 110a-110n to perform additional operations with respect to the PPCD 130. For instance, the secure content manager 160 may function as a document security and safety check point, to backup the PPCD 130 at various points along the workflow, to timestamp the PPCD 130 at various points along the workflow, to scan a part of the PPCD 130 that is exclusively accessible by the secure content manager 160 that contains security compliance rules that the secure content manager 160 may compare with other information contained in the PPCD 130 to determine whether the PPCD 130 is in compliance with the security compliance rules, and the like.

In any regard, the access manager 102 and the secure content manager 160 may comprise hardware devices, such as, computers, servers, circuits, etc., configured with machine readable instructions to perform various functions in the digital document workflow 100. In addition, or alternatively, the access manager 102 and the secure content manager 160 may comprise machine-readable instructions stored on computer-readable media. In any regard, the various functions that the access manager 102 and the secure content manager 160 may perform are discussed in greater detail herein below.

According to an example, some or all of the participants 110a-110n, 162 may not access the PPCD 130 from a common database that controls access to the PPCD 130. Instead, the PPCD 130 may be supplied to one of the participants 110a, 162 and the PPCD 130 may be transferred among the participants 110a-110n according to a predetermined workflow order through, for instance, e-mail, a shared server, direct file transfer, removable storage medium, etc. Some or all of the participants 110a-110n, 162 may not be granted access to the secure environment of the apparatus 102 in instances where such access is impractical or prohibited.

Figure 2:
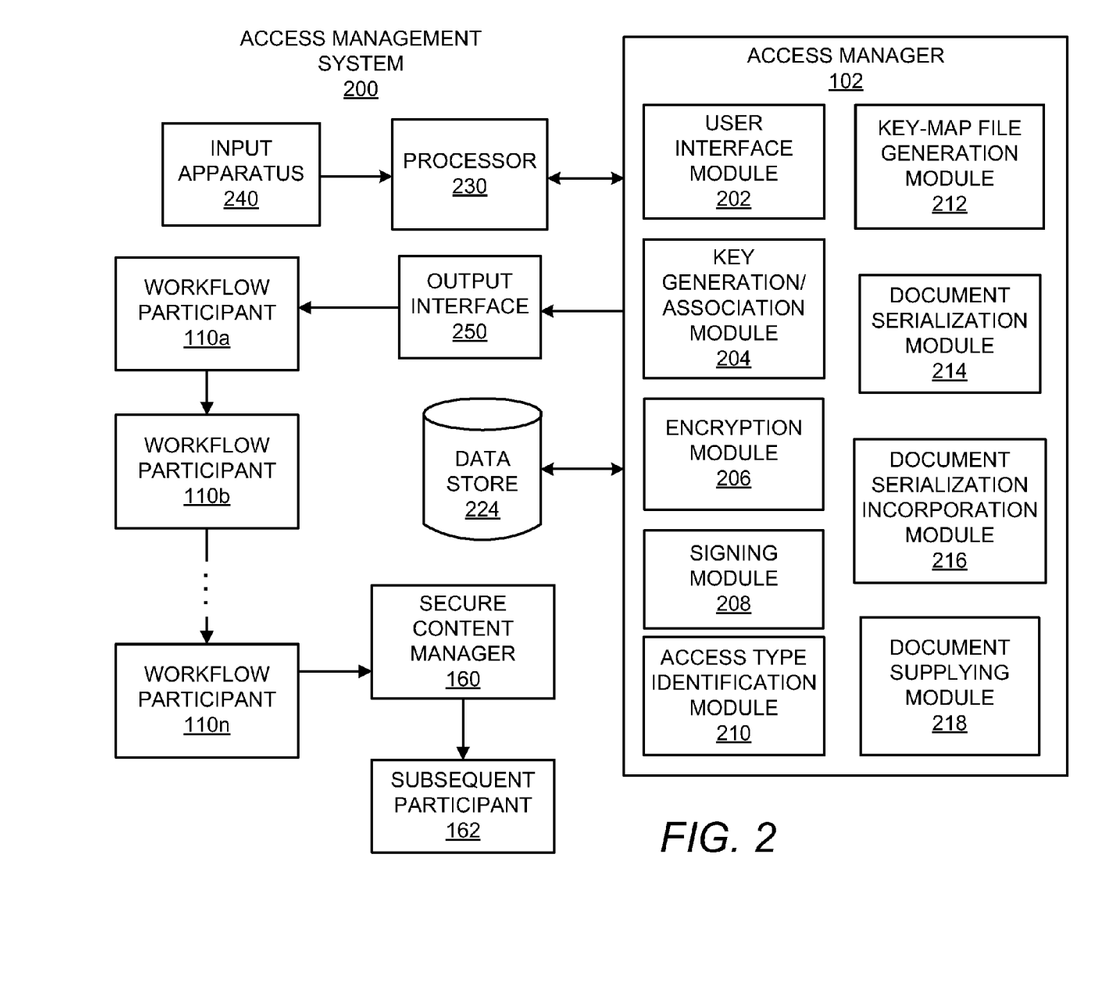
FIGS. 2 and 3, respectively, show simplified block diagrams of access management systems, according to examples of the present disclosure.
Figure 3:
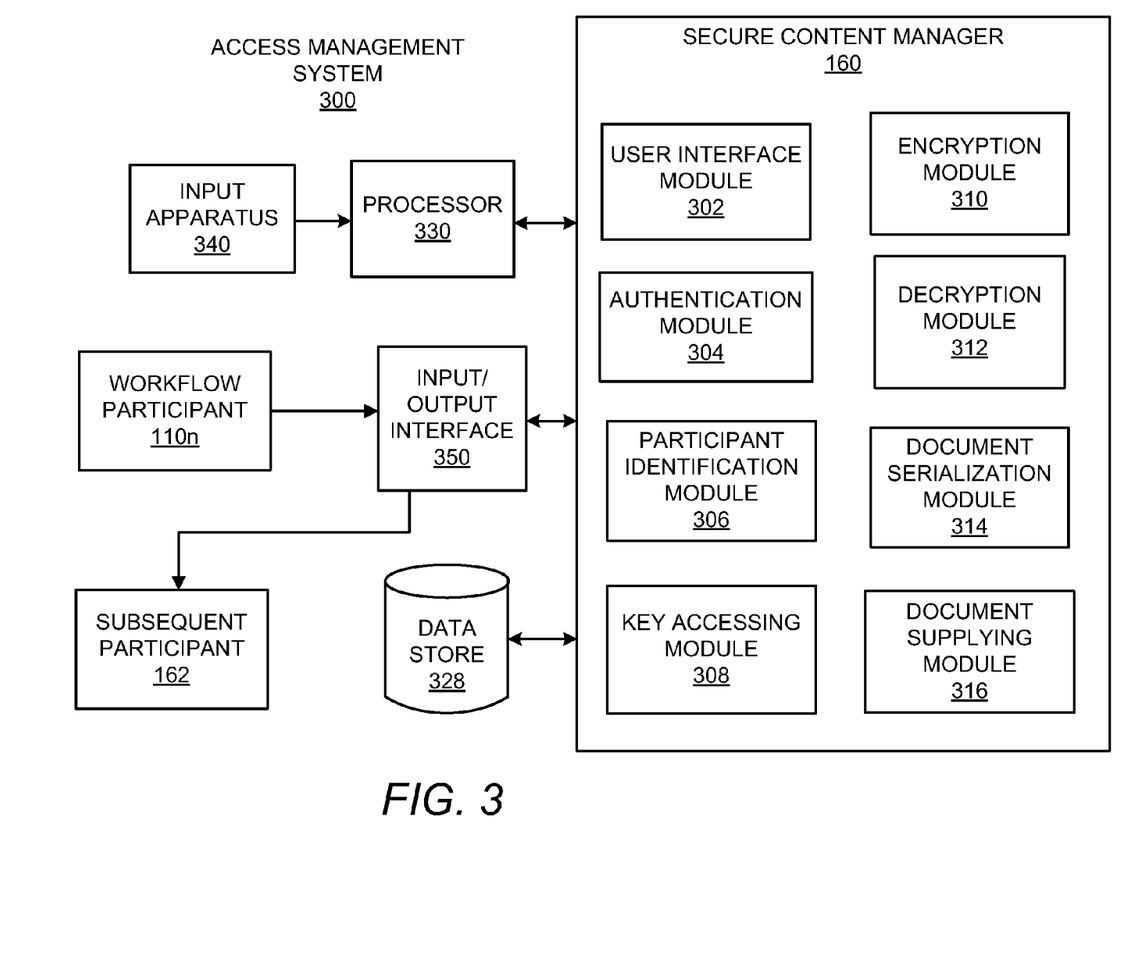

With particular reference now to FIGS. 2 and 3, there are shown respective simplified block diagrams of access management systems 200 and 300, according to two examples. It should be apparent that the block diagrams depicted in FIGS. 2 and 3 represent generalized illustrations and that other components may be added or existing components may be removed, modified or rearranged without departing from a scope of the access management systems 200 and 300. The access management system 200 in FIG. 2 is depicted as including the access manager 102 and the access management system 300 in FIG. 3 is depicted as including the secure content manager 160.

As shown in FIG. 2, the access manager 102 includes a user interface module 202, a key generation/association module 204, an encryption module 206, a signing module 208, an access type identification module 210, a key-map file generation module 212, a document serialization module 214, a document serialization incorporation module 216, and a document supplying module 218. Various manners in which the modules 202-218 of the access manager 102 may be implemented are described in greater detail in U.S. patent application Ser. No. 13/106,354.

As shown in FIG. 3, the secure content manager 160 includes a user interface module 302, an authentication module 304, a participant identification module 306, a key accessing module 308, an encryption module 310, a decryption module 312, a document serialization module 314, and a document supplying module 316.

The modules 202-218 and 302-316 of the access manager 102 and the secure content manager 160 may comprise modules containing machine readable instructions, hardware modules, or a combination of modules containing machine readable instructions and hardware modules. Thus, in one example, at least one of the modules 202-218, 302-316 comprises circuit components. In another example, at least one of the modules 202-218, 302-316 comprises machine readable instructions stored on a computer readable storage medium, which is executable by a processor.

In any regard, the access manager 102 and the secure content manager 160 are to be implemented and/or executed by a respective processor 230, 330. Thus, for instance, the access manager 102 may comprise an integrated and/or add-on hardware device of a computing device comprising the processor 230 and the secure content manager 160 may comprise an integrated and/or add-on hardware device of a computing device comprising the processor 330. As another example, the access manager 102/secure content manager 160 may comprise a computer readable storage device upon which machine readable instructions for each of the modules 202-218/302-316 are stored and executed by the processor 230/330.

As further shown in FIGS. 2 and 3, the processors 230, 330 are to receive input from an input apparatus 240, 340. The input apparatuses 240, 340 may comprise, for instance, user interfaces through which users may supply keys for use in encrypting and signing the digital document 120 and/or the content-parts 122a-122n. The input apparatuses 240, 340 may also comprise user interfaces through which a user may supply keys, such as, public keys, for use in encrypting/signing the key-map files 144a-144m. In addition, the input apparatuses 240, 340 may be used as an interface through which access types to be granted to the secure content to each of the participants 110a-110n, 162 may be inputted. In any regard, the processor 230, 330 is to execute or implement the access manager 102/secure content manager 160 to perform various functions with respect to the digital document workflow 100 depicted in FIG. 1 and discussed in greater detail herein below. In one regard, the processors 230, 330 may control the output of the PPCD 130 to at least some of the participants 110a-110n, 162 through a respective output interface 250, 350. As further shown in FIG. 3, the secure content manager 160 may also communicate directly with the participants 110a-110n, 162 through, for instance, the input/output interface 350.

Specially generated/derived keys assigned for each content-part 122a-122n and used to encrypt and sign the content-parts 122a-122n, may be stored in a data store 224, 328. The private decryption key of the secure content manager 160, which the secure content manager 160 may use to decrypt the key-map files of PPCDs, as well as the signature-verification key, which the secure content manager 160 may use to verify the signatures of the key-map files, and other keys used to decrypt the content-parts 132a-132n and verify the authenticity of the content-parts 132a-132n may also be stored in the data store 328 of the secure content manager 160. The data stores 224, 328 may comprise volatile and/or non-volatile memory, such as DRAM, EEPROM, MRAM, phase change RAM (PCRAM), Memristor, flash memory, and the like. In addition, or alternatively, the data stores 224, 328 may comprise devices to read from and write to a removable media, such as a floppy disk, a CD-ROM, a DVD-ROM, or other optical or magnetic media.

Figure 4:
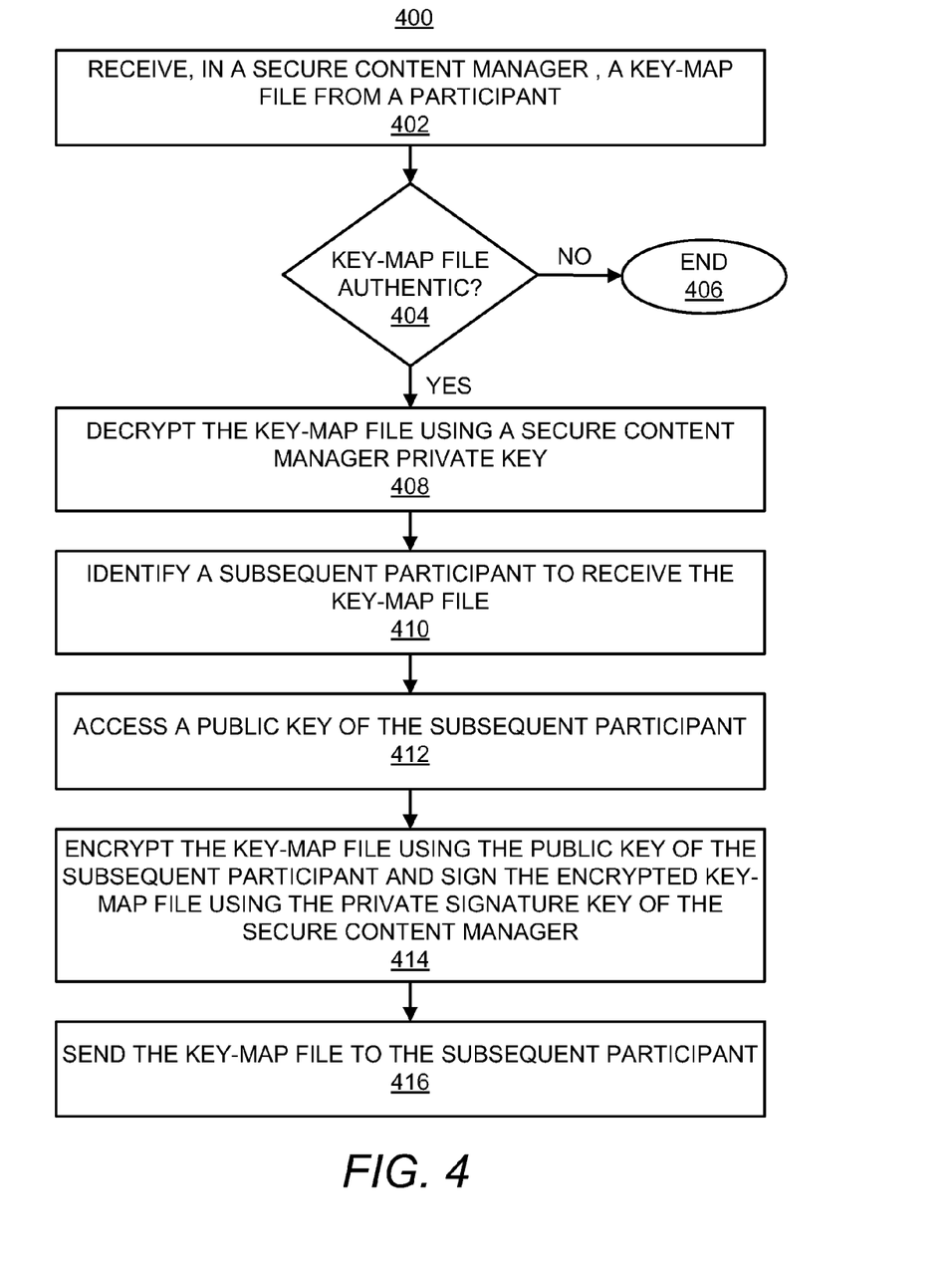
FIGS. 4 and 5, respectively, show flow diagrams of methods for managing access to a secure content-part of a PPCD following introduction of the PPCD into a workflow among a plurality of workflow participants, according to examples of the present disclosure.
Figure 5:
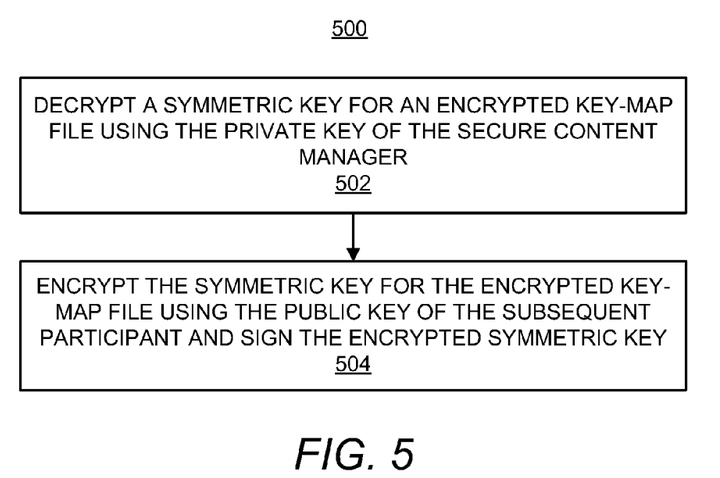

Various manners in which the modules 302-316 of the secure content manager 160 may be implemented are described in greater detail with respect to FIGS. 4 and 5, which respectively depict flow diagrams of methods 400 and 500 for managing access to a secure content-part 132a-132n of a PPCD 130 following introduction of the PPCD 130 into a workflow among a plurality of workflow participants 110a-110n, according to examples of the present disclosure. It should be apparent that the methods 400 and 500 represent generalized illustrations and that other processes may be added or existing processes may be removed, modified or rearranged without departing from the scopes of the methods 400 and 500.

The descriptions of the methods 400 and 500 are made with particular reference to the access manager 102 and the secure content manager 160 depicted in FIGS. 1-3. It should, however, be understood that the methods 400 and 500 may be implemented in at least one apparatus that differs from the access manager 102/secure content manager 160 without departing from the scopes of the methods 400 and 500. According to an example, the methods 400 and 500 are implemented autonomously by the secure content manager 160 in response to receipt of the secure content from a participant 110a-110n.

With reference first to the method 400 in FIG. 4, at block 402, the secure content manager 160 receives a key-map file 144a for the subsequent participant 162 from a participant 110n, for instance, through the input/output interface 350, as part of a workflow among the participants 110a-110n. The secure content manager 160 may receive the key-map file 144a along with the secure content-parts 132a-132n of a PPCD 130 or separately from the secure content parts 132a-132n of a PPCD 130. According to an example, the key-map file 144a (PPCD 130) may be received through a web upload by a participant 110n, for instance, when the participant 110n has been instructed that the next participant in the workflow is the secure content manager 160. In any regard, and as discussed above, the access manager 102 may have encrypted and signed the content-parts 132a-132n using various encryption keys and a signature key prior to the introduction of the PPCD 130 into the workflow. In addition, the access manager 102 may have encrypted the key-map file 144a using a public key of the secure content manager 160 and may have signed the key-map file 144a using a signature key of the access manager 102. Alternatively, and as discussed below with respect to FIG. 5, the access manager 102 may have encrypted the key-map file 144a using a symmetric key, encrypted the symmetric key using the public key of the secure content manager 160, signed the encrypted key-map file 144a using a signature key, and may have placed the encrypted symmetric key of the secure content manager 160 into an entry table.

At block 404, a determination as to whether the key-map file 144a is authentic is made, for instance, by the authentication module 304. According to an example, the authentication module 304 uses the known signature verification key of the corresponding PPCD master/owner, whose private signature key was used to sign the key-map file 144a, to determine whether the key-map file 144a is authentic. That is, the authentication module 304 may determine that the key-map file 144a is authentic if the signature is verified.

If the authentication module 304 determines that the key-map file 144a is inauthentic, the method 400 may end as indicated at block 406. The secure content manager 160 may discard the key-map file 144a (secure content-parts 132a-132n of the PPCD 130) and/or may alert an administrator, such as, the document creator/owner/master of the issue.

If, however, the authentication module 304 determines that the key-map file 144a is authentic, at block 408, the encrypted key-map file 144a for the subsequent participant 162 is decrypted using the private key of the secure content manager 160, for instance, by the decryption module 312. In addition, at block 410, a subsequent participant 162 that is to receive the key-map file 144a (PPCD 130) is identified, for instance, by the participant identification module 306. According to another example, the secure content manager 160 may receive the identity of the subsequent participant 162 from the document master. Thus, for instance, the secure content manager 160 may have previously received the identity of the subsequent participant 162, information on how to verify the identity of the subsequent participant 162 to thus establish the trusted and valid public key of the subsequent participant 162, along with information pertaining to how the secure content manager 160 is to send the PPCD 130 to the subsequent participant 162, and may have stored that information in the data store 328. In this example, the secure content manager 160 may receive the identity of the subsequent participant 162 as well as the other information at any time before, during, or after the PPCD 130 has been introduced into the workflow. According to another example, the identity of the subsequent participant 162 is retrieved from the PPCD 130. In this example, for instance, the document master may have inserted information pertaining to the identity of the subsequent participant 162 in the PPCD 130 prior to introducing the PPCD 130 into the workflow. In addition, the document master may have encrypted that information, for instance, in the key-map file 144a, so that the prior participants 110a-110n are unable to access that information. If such information was inserted into the key-map file 144a, the secure content manager 160 is to remove this information prior to encrypting and shipping the key-map file 144a to the subsequent participant 162.

At block 412, a public key of the subsequent participant 162 is accessed, for instance, by the key accessing module 308. According to an example, the secure content manager 160 receives and/or establishes the public key of the subsequent participant 162 at any time following authentication of the subsequent participant 162. In addition, the public key of the subsequent participant 162 may be stored in the data store 328 and the key accessing module 308 may access the public key from the data store 328. In other examples, the key accessing module 308 may access the public key from a location external to the access management system 300, such as, for instance, an external data store, the document creator/owner/master, etc.

At block 414, the key-map file 144a for the subsequent participant 162 is encrypted using the public key of the subsequent participant 162, for instance, by the encryption module 310, and the encrypted key-map file 144a is signed using the private signature key of the secure content manager 160. According to an example, the encryption of the key-map file 144a is performed while the key-map file 144a is contained in the PPCD 130. In another example, the key-map file 144a may be extracted from the PPCD 130 prior to the encryption and inserted back into the PPCD 130 following encryption, for instance, by the document serialization module 314.

At block 416, the encrypted key-map file 144a (PPCD 130) is sent, for instance, by the document supplying module 316, to the subsequent participant 162. As discussed above, the document supplying module 316 may send the key-map file 144a (PPCD 130) to the subsequent participant 162 through any of a number of different manners. According to an example, the secure content manager 160 sends the encrypted key-map file 144a without the PPCD 130 to the subsequent participant 162. In this example, the subsequent participant 162 may receive the PPCD 130 from one of the other participants 110a-110n or from the access manager 102. According to another example, the secure content manager 160 sends both the PPCD 130 and the encrypted key-map file 144a as either a single file or multiple files.

Although not shown in FIG. 4, the secure content manager 160 may implement additional management functions on the PPCD 130. For instance, the secure content manager 160 may store a copy of the PPCD 130 in the data store 328 prior to sending or outputting the PPCD 130 to the subsequent participant 162. As another example, the secure content manager 160 may timestamp the PPCD 130 prior to sending or outputting the PPCD 130 to the subsequent participant 162. As a further example, the PPCD 130 may include a part that includes security compliance rules, and that is exclusively accessible by the secure content manager 160, which the secure content manager 160 may access. The secure content manager 160 may also compare the security compliance rules contained in that part with other information contained in the PPCD 130 to check for compliance with the security compliance rules. That is, for instance, if the security compliance rules indicate that a certain part of the PPCD 130 is to be unaltered but the secure content manager 160 determines that that part has been altered, the secure content manager 160 may determine that a security compliance rule has been broken.

With reference now to the method 500 in FIG. 5, there is shown a flow diagram of a method 500 depicting operations that the secure content manager 160 may perform when the key-map file 144a for the subsequent participant 162 is encrypted using a symmetric key and the symmetric key has been encrypted using the public key of the secure content manager 160, for instance, by the access manager 102. More particularly, the method 500 depicts various operations that may be implemented prior to and during the encryption and signing of the key-map file 144a at block 414 of the method 400 depicted in FIG. 4. As shown in FIG. 5, at block 502, the encrypted symmetric key is decrypted using the private key of the secure content manager 160, for instance, by the decryption module 312. In addition, at block 504, which may replace block 414 in FIG. 4, the symmetric key is encrypted using the valid and trusted public key of the subsequent participant 162, for instance, by the encryption module 310, and the encrypted key-map file 144a is signed using the private signature key of the secure content manager 160. The symmetric key is a single secret key that is used for both encryption and decryption. In contrast, public-private key pairs are asymmetric keys because different keys are used for encryption and decryption.

Some or all of the operations set forth in the figures may be contained as a utility, program, or subprogram, in any desired computer readable storage medium. In addition, the operations may be embodied by machine-readable instructions. For example, they may exist as machine-readable instructions in source code, object code, executable code or other formats. Any of the above may be embodied on a computer readable storage medium, which include storage devices.

Examples of computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 6:
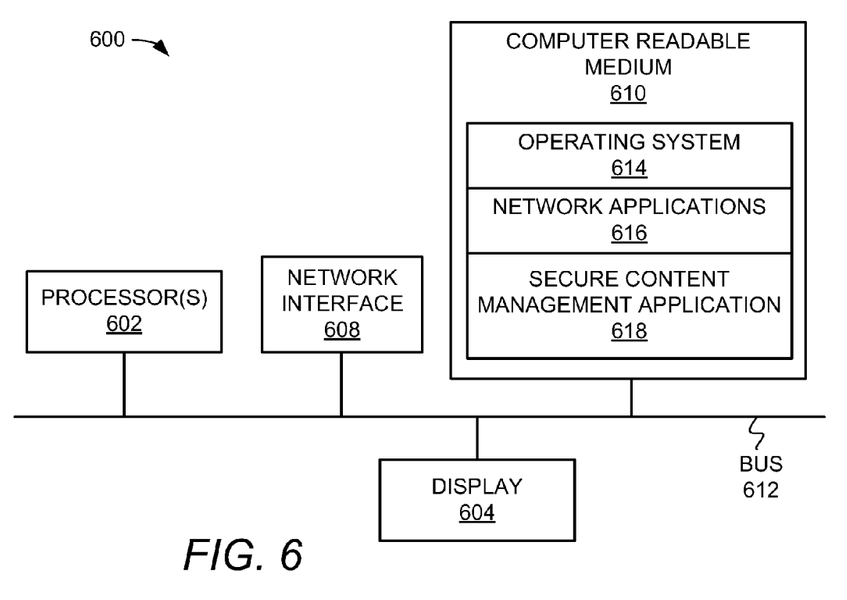
FIG. 6 shows a schematic representation of a computing device that may be used as a platform for implementing or executing at least one of the processes depicted in FIGS. 4 and 5, according to an example of the present disclosure.

Turning now to FIG. 6, there is shown a schematic representation of a computing device 600 that may be used as a platform for implementing or executing at least one of the processes depicted in FIGS. 4 and 5, according to an example. In this regard, the computing device 600 may represent a computing device that comprises the secure content manager 160. The device 600 includes a processor 602, such as a central processing unit; a display device 604, such as a monitor; a network interface 608, such as a Local Area Network LAN, a wireless 802.11x LAN, a 3G mobile WAN or a WiMax WAN; and a computer-readable medium 610. Each of these components is operatively coupled to a bus 612. For example, the bus 612 may be an EISA, a PCI, a USB, a FireWire, a NuBus, or a PDS.

The computer readable medium 610 may be any suitable medium that participates in providing instructions to the processor(s) 602 for execution. For example, the computer readable medium 610 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 610 may also store other machine-readable instructions, including word processors, browsers, email, Instant Messaging, media players, and telephony machine readable instructions.

The computer-readable medium 610 may also store an operating system 614, such as Mac OS, MS Windows, Unix, or Linux; network applications 616; and an access management application 618. The operating system 614 may be multi-user, multiprocessing, multitasking, multithreading, real-time and the like. The operating system 614 may also perform basic tasks, such as recognizing input from input devices, such as a keyboard or a keypad; sending output to the display 604 and the design tool 606; keeping track of files and directories on medium 610; controlling peripheral devices, such as disk drives, printers, image capture device; and managing traffic on the bus 612. The network applications 616 include various components for establishing and maintaining network connections, such as machine readable instructions for implementing communication protocols including TCP/IP, HTTP, Ethernet, USB, and FireWire.

The secure content management application 618 provides various machine readable instructions for managing access to secure content, as described above. Thus, for instance, the processor(s) 602 may implement the secure content management application 618 to determine whether a key-map file 144a received from a participant 110n is authentic, to identify a subsequent participant 162 to receive the key-map file 144a, to access a public key of the subsequent participant 162, to encrypt the key-map file 144a using the public key of the subsequent participant 162, and to send the key-map file 144a to the subsequent participant 162. In addition, or alternatively, the secure content management application 618 may be implemented to encrypt the key-map file 144a using a symmetric key and then to encrypt the symmetric key using the public key of the subsequent participant 162. In certain examples, some or all of the processes performed by the application 618 may be integrated into the operating system 614. In certain examples, the processes may be at least partially implemented in digital electronic circuitry, or in computer hardware, machine readable instructions (such as, firmware and/or software), or in any combination thereof.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, wherein the present disclosure is intended to be defined by the following claims—and their equivalents—in which all terms are mean in their broadest reasonable sense unless otherwise indicated.

What is claimed is:

1. A method for managing access to a secure content-part of a publicly posted composite document (PPCD) following introduction of the PPCD into a workflow among a plurality of workflow participants, said method comprising:
   in a secure content manager,
      receiving, from a workflow participant of the plurality of workflow participants, a key-map file for a subsequent workflow participant that is to receive the key-map file, wherein the key-map file comprises a set of keys to enable the subsequent workflow participant to access the content-part in the PPCD;
      verifying authenticity of the received key-map file;
      identifying and authenticating the subsequent workflow participant to receive the PPCD;
      accessing a public key of the subsequent workflow participant; and
      encrypting, using the public key of the subsequent workflow participant, by a processor, the key map file or a symmetric key used to encrypt the key-map file prior to receipt of the key-map file by the secure content manager; and
      sending the encrypted key-map file to the subsequent workflow participant.

2. The method according to claim 1, wherein the key-map file has been encrypted using a public key of the secure content manager prior to receipt of the key-map file by the secure content manager, said method further comprising:
   decrypting the encrypted key-map file using a private key of the secure content manager following verification of the authenticity of the key-map file.

3. The method according to claim 1, wherein the key-map file for the subsequent workflow participant has been encrypted using the symmetric key and wherein the symmetric key has been encrypted using a public key of the secure content manager prior to receipt of the key-map file by the secure content manager, said method further comprising:
   decrypting the encrypted symmetric key using a private key of the secure content manager;
   wherein accessing the public key of the subsequent workflow participant further comprises establishing a valid and trusted public key for the subsequent participant in response to the subsequent participant being authenticated; and
   wherein encrypting the symmetric key or the key-map file further comprises re-encrypting the symmetric key using the valid and trusted public key of the subsequent workflow participant.

4. The method according to claim 3, wherein the encrypted symmetric key is stored in an entry table, said method further comprising:
   storing the re-encrypted symmetric key in the entrytable.

5. The method according to claim 1, further comprising:
signing the encrypted symmetric key or the key-map file using a private signature key of the secure content manager.

6. The method according to claim 1, wherein receiving the key-map file further comprises receiving the key-map file through a web upload by the workflow participant.

7. The method according to claim 1, further comprising a prior key-map file for the workflow participant from which the key-map file for the subsequent workflow participant was received, and wherein the prior key-map file comprises an instruction for the workflow participant to send the key-map file for the subsequent workflow participant to the secure content manager as part of the workflow.

8. The method according to claim 1, further comprising:
receiving the PPCD with the key-map file;
incorporating the encrypted symmetric key or the encrypted key-map file into the PPCD; and
sending the PPCD and the encrypted symmetric key or the encrypted key-map file to the subsequent workflow participant.

9. The method according to claim 8, further comprising:
at least one of:
storing a copy of the PPCD prior to sending the PPCD to the subsequent workflow participant;
timestamping the PPCD prior to sending the PPCD to the subsequent workflow participant; and
implementing the secure content manager autonomously in response to receipt of the key-map file from the workflow participant.

10. The method according to claim 1, wherein the PPCD comprises a part that is exclusively accessible by the secure content manager, wherein the part contains security compliance rules, said method further comprising:
accessing the part; and
comparing the security compliance rules with other information contained in the PPCD to check for compliance with the security compliance rules.

11. A secure content manager for managing access to a secure content-part of a publicly posted composite document (PPCD) following introduction of the PPCD into a workflow among a plurality of workflow participants, said apparatus comprising:
at least one module to receive, from a workflow participant of the plurality of workflow participants, an encrypted key-map file for a subsequent workflow participant that is to receive the encrypted key-map file, wherein the encrypted key-map file comprises a set of keys to enable the subsequent workflow participant to access the content-part in the PPCD, to verify authenticity of the received encrypted key-map file, to identify and authenticate the subsequent workflow participant, to decrypt the encrypted key-map file or an encrypted symmetric key used to encrypt the key-map file in response to the authenticity of the encrypted key-map file being verified, to access a public key of the subsequent workflow participant, to re-encrypt, using the public key of the subsequent workflow participant, the key-map file or the symmetric key used to encrypt the key-map file prior to receipt of the key-map file by the secure content manager, and to send the re-encrypted key-map file to the subsequent workflow participant; and
a processor to implement the at least one module.

12. The secure content manager according to claim 11, wherein the key-map file has been encrypted using a public key of the secure content manager prior to receipt of the key-map file by the secure content manager, and wherein said at least one module is further to decrypt the encrypted key-map file using a private key of the secure content manager following verification of the authenticity of the key-map file.

13. The secure content manager according to claim 11, wherein the encrypted key-map file for the subsequent workflow participant has been encrypted using the symmetric key and wherein the symmetric key has been encrypted using a public key of the secure content manager prior to receipt of the key-map file by the secure content manager, and wherein the at least one module is further to decrypt the encrypted symmetric key using a private key of the secure content manager, to establish a valid and trusted public key for the subsequent participant in response to the subsequent participant being authenticated, and to re-encrypt the symmetric key using the valid and trusted public key of the subsequent workflow participant.

14. The secure content manager according to claim 11, wherein the at least one module is further to receive the PPCD with the key-map file and to at least one of:
store a copy of the PPCD prior to sending the PPCD to the subsequent workflow participant;
timestamp the PPCD prior to sending the PPCD to the subsequent workflow participant;
implement the secure content manager autonomously in response to receipt of the key-map file from the workflow participant; and
check for compliance with security compliance rules.

15. A non-transitory computer readable storage medium on which is embedded a computer program, said computer program implementing a method for managing access to a secure content-part of a publicly posted composite document (PPCD) following introduction of the PPCD into a workflow among a plurality of workflow participants, said computer program comprising a set of instructions to:
receive, in a secure content manager, from a workflow participant of the plurality of workflow participants, an encrypted key-map file for a subsequent workflow participant that is to receive the key-map file, wherein the key-map file comprises a set of keys to enable the subsequent workflow participant to access the content-part in the PPCD;
verify authenticity of the received key-map file;
decrypt one of the encrypted key-map and an encrypted symmetric key used to encrypt the key-map file using a public key of the secure content manager;
identify and authenticate the subsequent workflow participant to receive the PPCD;
establish a valid and trusted public key for the subsequent workflow participant in response to the subsequent workflow participant being authenticated;
re-encrypt, using the valid and trusted public key of the subsequent workflow participant, the key-map file and a symmetric key used to encrypt the key-map file; and
send the re-encrypted key-map file to the subsequent workflow participant.

* * * * *